Nov. 21, 1950      A. G. ROSE      2,530,786
CHAIN DRIVE
Filed June 10, 1946
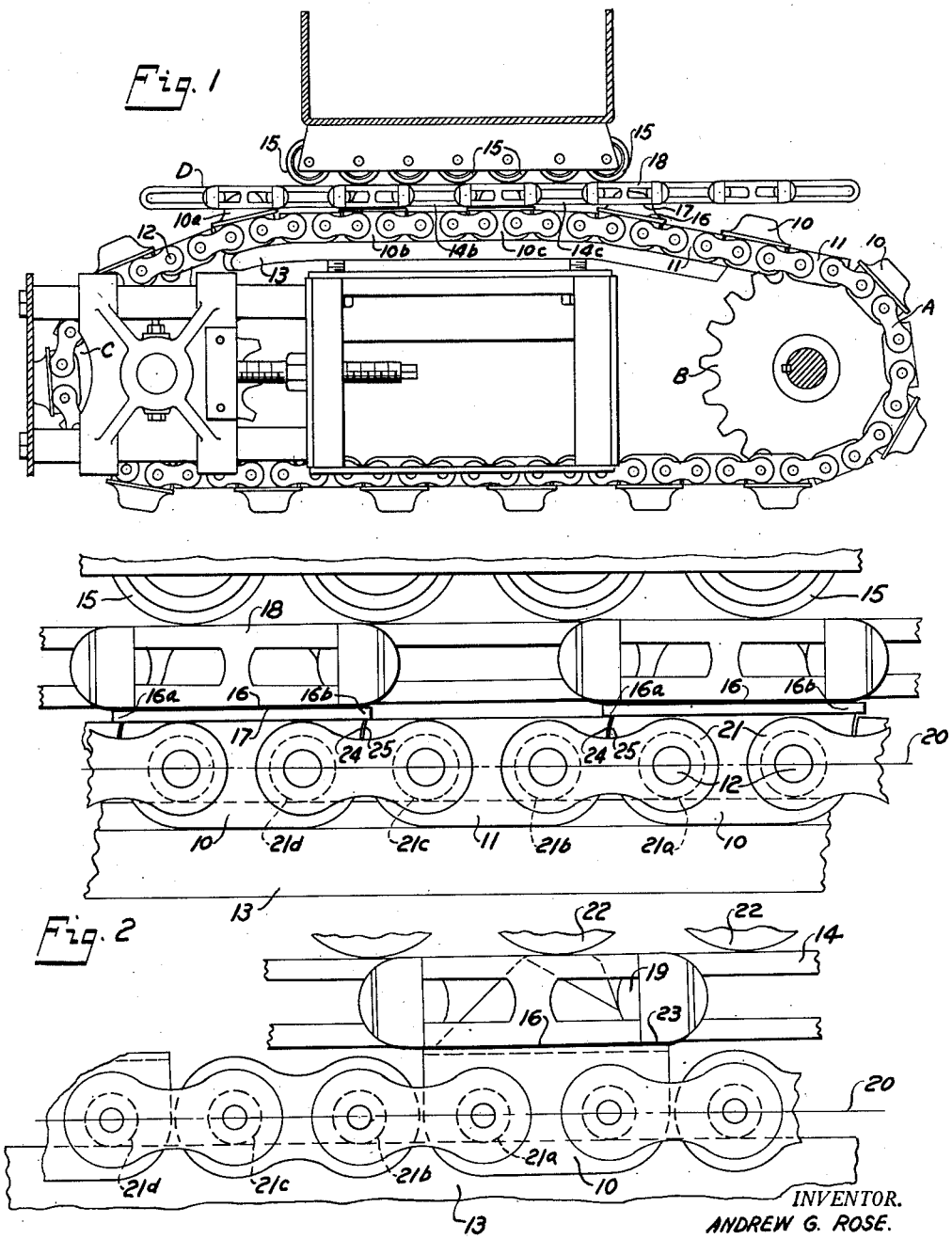
INVENTOR.
ANDREW G. ROSE.
BY Joseph Farley
ATTORNEY.

Patented Nov. 21, 1950

2,530,786

UNITED STATES PATENT OFFICE 2,530,786

CHAIN DRIVE

Andrew G. Rose, Detroit, Mich., assignor to Jervis B. Webb Company, Detroit, Mich., a corporation of Michigan Application June 10, 1946, Serial No. 675,692

9 Claims. (Cl. 74—221)

1

This invention relates to endless driving chains and more particularly to the type of driving chain wherein driving members extend outwardly from the surface of the chain to drivingly engage cooperating driven members.

Such driving chains are frequently employed in industrial conveyor systems as a means of propelling power driven conveyor chains where it is necessary or desirable to provide a drive at a straight section of the conveyor track.

Whenever the power to be transmitted by a driving chain is transmitted by members extending outwardly from the surface of such chain, there is a tendency for the resistive force imparted by each of the driven members to such outwardly extending driving members to rotate the driving members out of their normal position and to rotate associated chain links out of alignment with the centerline of the chain. Such rotative force results from the fact that the force moving the driving chain is transmitted along the centerline of its links while the resistive force opposing such motion is exerted along a line removed from such centerline. These opposed forces exert a torque on the driving members tending to rotate them, as indicated above.

If the line of tangency between the contact surfaces of driving and driven members is normally substantially perpendicular to the line of travel, there will be initially no direct force tending to separate such driving and driven members. However, if the torque exerted on the driving members is permitted to rotate such members out of their normal driving position, the line of tangency between driving and driven members will be shifted to a position where a component of the resistive force perpendicular to the centerline of the driving chain will tend to force the driving members and chain away from the driven members and out of driving engagement. The greater the rotation of the driving members from their normal position, the greater will be such component of force which might become sufficient to result in actual slippage between the driving chain and driven members.

Even though the above described rotation of driving members is initially insufficient to cause actual slippage in the drive, such rotation may cause excessive wear in the driving and driven surfaces which will ultimately result in slippage or else require costly replacement of parts at frequent intervals.

Susceptibility to such undesirable rotation in driving members is inherent in the conventional endless driving chain due to the flexibility of its construction, such flexibility being required to permit it to pass around the driving and the idler direction changing sprockets. The individual chain links are free to pivot around the locking

2 pins which serve to join the links, and the only force normally present in the driving chain itself to resist rotation of outwardly extending driving members is the tension exerted along the centerline of the chain. As a driving member rotates under the influence of the torque described above, the centerline of the chain links on one side of the driving member becomes displaced relative to the centerline of the links on the other side. A torque proportional to the relative displacement of such centerlines and to the tension in the chain thus resists rotation of the driving members. However, such resisting torque can never be effective to completely prevent such rotation since it does not acquire a positive value until some rotation and displacement of the centerlines has occurred. Furthermore, because of the relatively low value of such resisting torque for small displacements, it is ordinarily not practicable to provide sufficient tension in the chain to avoid substantial rotation of the driving members, especially since increased tension in the chain results in increased wear in both the sprockets and portions of the chain which contact the sprockets as well as on the connecting pins. Because of the relatively long distance that is usually provided between sprockets, tension in the chain is even less adequate to resist the component of force tending to move the driving members and chain away from the driven members.

One means that has been employed to resist such rotative force and to hold the chain in proper driving position is a back-up bar extending between the sprockets to bear against the inner side of the driving portion of the chain. Where the endless chain drive is used to drive a conveyor chain, such latter chain may also be held in position as by a plurality of rollers positioned to contact its far side, both conveyor chain and drive chain being thus prevented from spreading apart. The endless drive chain is normally of the roller type and the back-up bar is formed with a relatively narrow contact surface that will fit within the side links and bear against the rollers. The driving members, which comprise special inner side links having centrally disposed outwardly extending driving members, may be provided with longitudinal shoulders for contacting the adjacent surface of the conveyor chain.

By this means the torque tending to rotate any driving member is counteracted by a torque comprising the pressure of the back-up bar against the rearward roller associated with a driving member and the oppositely directed pressure of the roller contacting the conveyor chain forward of such driving members, the latter force being transmitted through the conveyor chain to the shoulders of the driving member. While such means are effective in preventing or limiting rotation of the driving members, it will be seen that the torque exerted on any driving member is not uniformly distributed over a number of rollers contacting the back-up bar, but is rather absorbed by the single roller associated with the rearward end of such driving member with resultant excessive wear to such roller.

It is the principal object of the present invention to provide a construction for an endless driving chain having outwardly extending driving members whereby the links of the chain itself will resist the tendency for the driving members to be rotated out of their normal position.

Another object is to provide a construction whereby such resistance will be effective independently of any overall tension in the driving chain.

A further object is to provide a construction for the chain links which will permit them to articulate freely in the direction required to pass around their sprocket members but which will cause them to be rigid against articulation in the opposite direction beyond a predetermined maximum point.

Another object is to provide adjacent links of the chain with cooperating engaging surfaces on the outside of the centerline of the chain while providing clearance between corresponding surfaces inside of the centerline of the chain sufficient to permit their free pivotal articulation in passing around the sprocket members.

These and other objects of the invention will appear more clearly from the following detailed description of a particular embodiment thereof and from an examination of the attached drawings wherein, Fig. 1 is a side elevation of an endless drive chain incorporating a construction representing the preferred embodiment of the present invention and showing a portion of a conventional conveyor chain being driven thereby;

Fig. 2 is an enlarged fragmentary side elevation of such preferred drive chain in engagement with said conveyor chain;

Fig. 3 is a side elevation similar to that of Fig. 2, showing a drive chain of conventional prior art construction.

Referring to Fig. 1, a chain A of the roller type is driven by a sprocket B and passes at its other end around an idler sprocket C. Driving dogs 10 constructed as special inner side links are inserted in the chain A at spaced intervals. Inner links 11 are alternately located in the chain A between the driving dog members 10. As a driving dog passes around sprocket C, it gradually approaches the conveyor chain D as in the case of driving dog 10—a. The rollers 21 (see Fig. 2) journaled on locking pins 12 and extending between the inner side links 11 and the side members of the locking dogs 10, after they leave the sprocket C contact a back-up bar 13 which guides the chain A and driving dogs, such as 10—b and 10—c, into driving engagement with the ends of center links, such as 14—b and 14—c of the driven chain D. A plurality of rollers 15 positioned above the conveyor chain D guide such chain into proper position to be engaged and driven by the driving dogs 10. Longitudinally extending shoulders 16 provided on the driving dogs 10 contact the lower surface 17 of the side bars 18 of the conveyor chain D.

Referring to the enlarged view of a section of the conventional chain shown in Fig. 3, the resistive force exerted by the end 19 of the center link 14 together with the oppositely directed pulling force along the centerline 20 of the chain constitute a couple tending to rotate the driving dog 10 in a counterclockwise direction. A counteracting couple resisting such rotation is exerted by the back-up bar 13 against the roller 21a at the left hand side of said dog 10 and by the rollers 22 against the conveyor chain and the right hand end 23 of the shoulder 16 of the driving dog 10. It will be noted that because of the pivotal connection between adjacent chain links, the contact of rollers 21—b, 21—c and 21—d with the back-up bar 13 is ineffective in resisting the rotation of the driving dog 10.

As shown in Fig. 2, the present invention incorporates a construction for the driving chain wherein the adjacent ends of adjacent inner links 11 and driving dogs 10 are provided with cooperating abutting surfaces 24, 25 above the centerline 20 of the chain, while below such centerline said ends are rounded off or curved to provide clearance for free articulation of the chain links about their respective locking pins 12 in the direction required to pass around the driving and idler sprockets B and C. The abutting surfaces 24, 25 are arranged so as to come into engagement when the centerlines of the individual links lie in a substantially straight line, thereby limiting articulation of such links in a direction opposite to that required to pass around the sprockets. In addition, extensions 16a and 16b of the driving dog shoulder 16 overlie the adjacent ends of adjacent inner links 11—a in a manner similarly limiting the articulation of such links. In effect, a chain is thereby provided which is flexible in one direction, but rigid in the opposite direction.

With this construction, the torque tending to rotate the driving dog 10 brings the extension 16a into engagement with the adjacent corner of the inner link 11 and creates a pressure between abutting surfaces 24, 25 and a tension in the outer side links 26 which in turn transmits such torque to each of the rollers 21—b, 21—c and 21—d. These rollers bear against the back-up bar 13 and assist roller 21—a in resisting such torque. By properly coordinating the contour of the back-up bar 13 and the construction of the abutting surfaces 24, 25, substantially equal pressure of all rollers in the chain may be effected. Due to the progressively longer moment arms on which the torque resistive force of the back-up bar transmitted to rollers 21—b, 21—c and 21—d is effective in counteracting the rotative torque applied to the driving dog 10, the combined total force exerted by the back-up bar on all of the rollers need be only a fraction of the force that must be applied to the single roller 21a acting on a relatively short moment arm. Thus, the pressure and resultant wear may not only be distributed evenly over all of the rollers in the chain, but the total pressure itself may be reduced to a fraction of its normal value by the chain construction embodying the present invention. The combined effect of these two factors results in substantially greater chain life and reduced maintenance costs.

Furthermore, where the distance between driving and idler sprockets is comparatively small, this new chain construction makes it possible to entirely eliminate the use of a back-up bar, in which case the torque tending to rotate the driving members may be transmitted back through adjacent links to the idler sprocket whereupon a counteracting force exerted by the idler sprocket will effectively resist such rotation. In effect, this improved driving chain simulates a solid bar with rigid outwardly extending driving members which bar is supported at either end by sprocket members, being flexible only in the direction required to pass around the sprockets.

Although I have described a particular embodiment of my invention, it will be realized that numerous changes in the detailed construction are possible without departing from the spirit of my invention as reflected in the appended claims.

I claim:

1. A driving chain having outwardly extending drive dogs characterized by adjacent inner links which are provided with cooperating abutting surfaces on the outer side of the centerline of said chain, and are provided with corresponding opposed surfaces on the inner side of said centerline having a clearance sufficient to permit free pivotal articulation in passing around sprocket members.

2. A driving chain such as described in claim 1 wherein said abutting surfaces come into engagement when the individual links are in substantially straight alignment.

3. In an endless driving chain of the roller type having inner links and outer links pivotally attached by locking pins passing through their respective ends and wherein driving members extend outwardly from the surface of the chain to drivingly engage cooperating driven members in a manner whereby the resistive force imparted by each of said driven members to said driving members is exerted along a line other than the centerline of said driving chain thereby creating a torque tending to rotate said driving members and the individual chain links to which said driving members are attached out of alignment with said centerline, and wherein a fixed back-up member is provided to bear against the inner surface of the driving chain and prevent such rotation, means for distributing said torque from each driving member to a plurality of adjacent links whereby the resistive force exerted by the back-up member is applied to such adjacent links as well as the link which carries said driving member, said means comprising abutting surfaces in adjacent links which come into engagement when said chain is extended in a substantially straight line.

4. In an endless driving chain of the roller type having inner links and outer links pivotally attached by locking pins passing through their respective ends and wherein driving members extend outwardly from the surface of the chain to drivingly engage cooperating driven members in a manner whereby the resistive force imparted by each of said driven members to said driving members is exerted along a line other than the centerline of said driving chain thereby creating a torque tending to rotate said driving members and the individual chain links to which said driving members are attached out of alignment with said centerline, and wherein a fixed back-up member is provided to bear against the inner surface of the driving chain and prevent such rotation, means for distributing said torque from each driving member to a plurality of adjacent links whereby the resistive force exerted by the back-up member is applied to such adjacent links as well as the link which carries said driving member, said means comprising inner links constructed with cooperating abutting surfaces which are positioned to engage and limit relative articulation in a direction opposite to that required for the chain to pass around sprocket members.

5. An endless driving chain comprising pivotal tension links and driving dogs having engaging surfaces exterior of the center line of said tension links, and positively engaging surfaces in said chain links for resisting the torque applied to said dogs as a result of reactive forces against said engaging surfaces through limiting the relative articulation of said links in a direction opposite to that required for the chain to change its direction of travel.

6. An endless driving chain comprising pivotal tension links and driving dogs having engaging surfaces exterior of the center line of said tension links, said chain links having cooperating abutting surfaces exterior of said center line for limiting their relative articulation and thereby resisting the torque applied to said dogs as a result of reactive forces against said engaging surfaces.

7. An endless driving chain comprising pivotal inner and outer tension links and driving dogs having engaging surfaces exterior of the center line of said tension links, the inner links of said chain having cooperating abutting surfaces exterior of said center line for limiting their relative articulation and thereby resisting the torque applied to said dogs as a result of reactive forces against said engaging surfaces.

8. An endless driving chain of the roller type comprising inner and outer links pivotally attached by locking pins passing through their respective ends, said inner links at spaced intervals in the chain being formed with outwardly projecting extensions to serve as driving members, means for resisting the reactive torque applied to such extensions comprising cooperating abutting surfaces in said driving members and in the other inner links which are formed to engage and resist relative articulation in a direction opposite to that required for a chain to change its direction of travel.

9. A driving chain having longitudinally spaced outwardly extending drive dogs associated with individual chain links and adapted to establish load contact outside of the centerline of said chain characterized by cooperating abutting surfaces incorporated on the outer side of the centerline of adjacent chain links, said abutting surfaces being adapted to transmit driving reaction torque applied through said off-center driving contact to the individual drive dog links back to said adjacent links thereby enabling said adjacent links to contribute substantially in resisting rotation of said individual drive dog links without limiting the flexibility of the chain in the direction required to pass around inside sprockets.

ANDREW G. ROSE.

REFERENCES CITED

The following references are of record in the file of this patent:

UNITED STATES PATENTS

| Number | Name | Date |
|---|---|---|
| 795,166 | Piez | July 18, 1901 |
| 1,847,152 | Webb et al. | Mar. 1, 1932 |